United States Patent
Kadokura

(10) Patent No.: US 10,921,789 B2
(45) Date of Patent: Feb. 16, 2021

(54) FINISH-MACHINING AMOUNT PREDICTION APPARATUS AND MACHINE LEARNING DEVICE

(71) Applicant: FANUC CORPORATION, Yamanashi (JP)

(72) Inventor: Hiromitsu Kadokura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 163 days.

(21) Appl. No.: 15/908,893

(22) Filed: Mar. 1, 2018

(65) Prior Publication Data

US 2018/0259946 A1 Sep. 13, 2018

(30) Foreign Application Priority Data

Mar. 8, 2017 (JP) .............................. JP2017-044274

(51) Int. Cl.
*G05B 19/418* (2006.01)
*G06N 20/00* (2019.01)
(Continued)

(52) U.S. Cl.
CPC ........ *G05B 19/41865* (2013.01); *B24B 49/04* (2013.01); *G05B 13/0265* (2013.01);
(Continued)

(58) Field of Classification Search
CPC ........ G06N 20/00; G06N 3/02; G06N 3/0445; G06N 3/084; G05B 19/4183;
(Continued)

(56) References Cited

U.S. PATENT DOCUMENTS

2015/0142154 A1* 5/2015 Tiano ............... G05B 19/41875
700/109
2017/0031328 A1 2/2017 Sawada et al.
(Continued)

FOREIGN PATENT DOCUMENTS

CN 101738981 A 6/2010
CN 105867305 A 8/2016
(Continued)

OTHER PUBLICATIONS

Tsai et al., An in-process surface recognition system based on neural networks in end milling cutting operations, International Journal of Machine Tools & Manufacture 39, pp. 583-605, 1999. (Year: 1999).*

(Continued)

*Primary Examiner* — Kamran Afshar
*Assistant Examiner* — Marshall L Werner
(74) *Attorney, Agent, or Firm* — Hauptman Ham, LLP

(57) ABSTRACT

A machine learning device of a finish-machining amount prediction apparatus observes, as state variables expressing a current state of an environment, finish-machining amount data indicating finish-machining amounts of the respective parts of a component and accuracy data indicating the accuracy of the respective parts of a machine, to which the component is attached. Then, the machine learning device acquires determination data indicating propriety determination results of the accuracy of the respective parts of the machine, to which the component after being subjected to finish machining is attached. After that, the machine learning device learns the finish-machining amounts of the respective parts of the component in association with the accuracy data by using the state variables and the determination data.

13 Claims, 8 Drawing Sheets

(51) Int. Cl.
*B24B 49/04* (2006.01)
*G05B 13/02* (2006.01)

(52) U.S. Cl.
CPC ... *G05B 19/4183* (2013.01); *G05B 19/41875* (2013.01); *G06N 20/00* (2019.01); *G05B 2219/31407* (2013.01); *G05B 2219/32194* (2013.01); *G05B 2219/36219* (2013.01)

(58) Field of Classification Search
CPC .......... G05B 19/41865; G05B 23/0221; G05B 23/0294; G05B 2219/31407; G05B 2219/36219; G05B 2219/37434
See application file for complete search history.

(56) References Cited

U.S. PATENT DOCUMENTS

| | | |
|---|---|---|
| 2017/0032283 A1 | 2/2017 | Kamiya |
| 2017/0060105 A1 | 3/2017 | Onodera et al. |
| 2017/0063284 A1 | 3/2017 | Matsumoto et al. |
| 2017/0090430 A1 | 3/2017 | Nakazawa |

FOREIGN PATENT DOCUMENTS

| | | |
|---|---|---|
| JP | H4-106603 A | 4/1992 |
| JP | H4-135209 A | 5/1992 |
| JP | H7-68456 A | 3/1995 |
| JP | H8-305424 A | 11/1996 |
| JP | H9-212218 A | 8/1997 |
| JP | 10-156715 A | 6/1998 |
| JP | 2880569 B2 | 4/1999 |
| JP | 2001-22422 A | 1/2001 |
| JP | 6063016 B1 | 1/2017 |
| JP | 2017-33239 A | 2/2017 |
| JP | 2017-33526 A | 2/2017 |
| JP | 2017-42882 A | 3/2017 |
| JP | 2017-45406 A | 3/2017 |

OTHER PUBLICATIONS

Risbood et al., Prediction of surface roughness and dimensional deviation by measuring cutting forces and vibrations in turning process, Journal of Materials Processing Technology 132, pp. 203-214, 2003. (Year: 2003).*

Wang et al., An efficient error compensdation system for CNC multi-axis machines, International Journal of Machine Tools & Manufacture 42, pp. 1235-1245, 2002. (Year: 2002).*

Office Action in Japanese Application No. 2017-044274, dated Sep. 18, 2018, 11 pp.

Extended European Search Report in EP Application No. 18156299.2, dated Aug. 8, 2018, 7pp.

Office Action in TW Application No. 107106729, dated Aug. 29, 2019, 6pp.

Office Action in JP Application No. 2017-044274, dated Feb. 19, 2019, 3pp.

Notice of Grounds for Rejection issued in Korean Patent Application No. 10-2018-0026352; dated Dec. 2, 2019; 10 pgs.

* cited by examiner

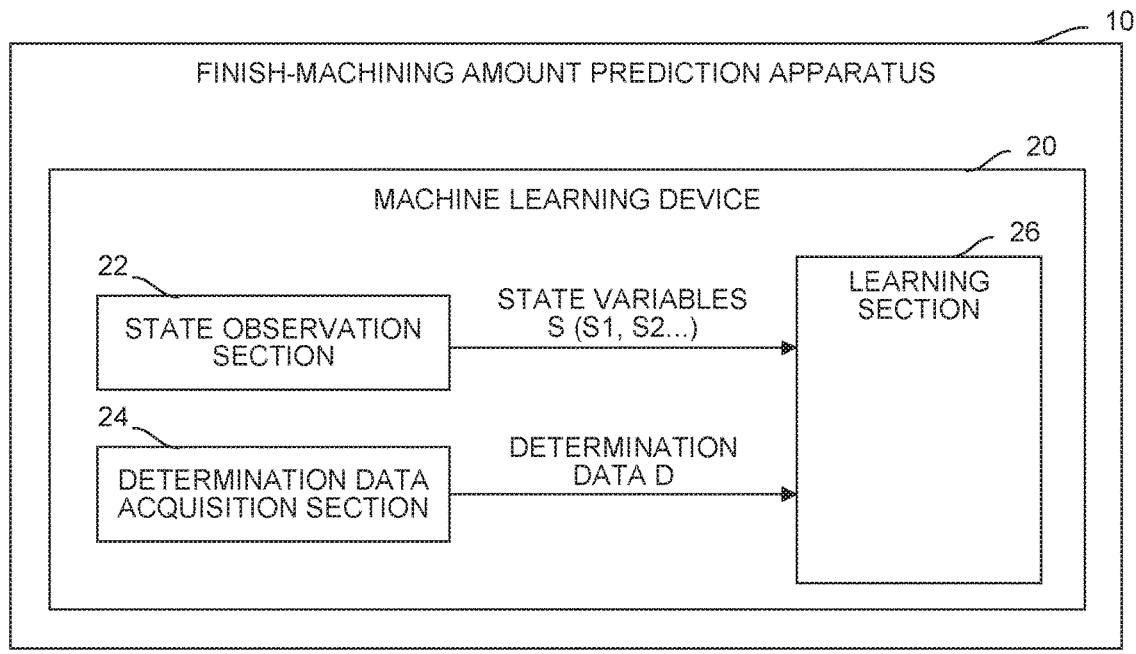
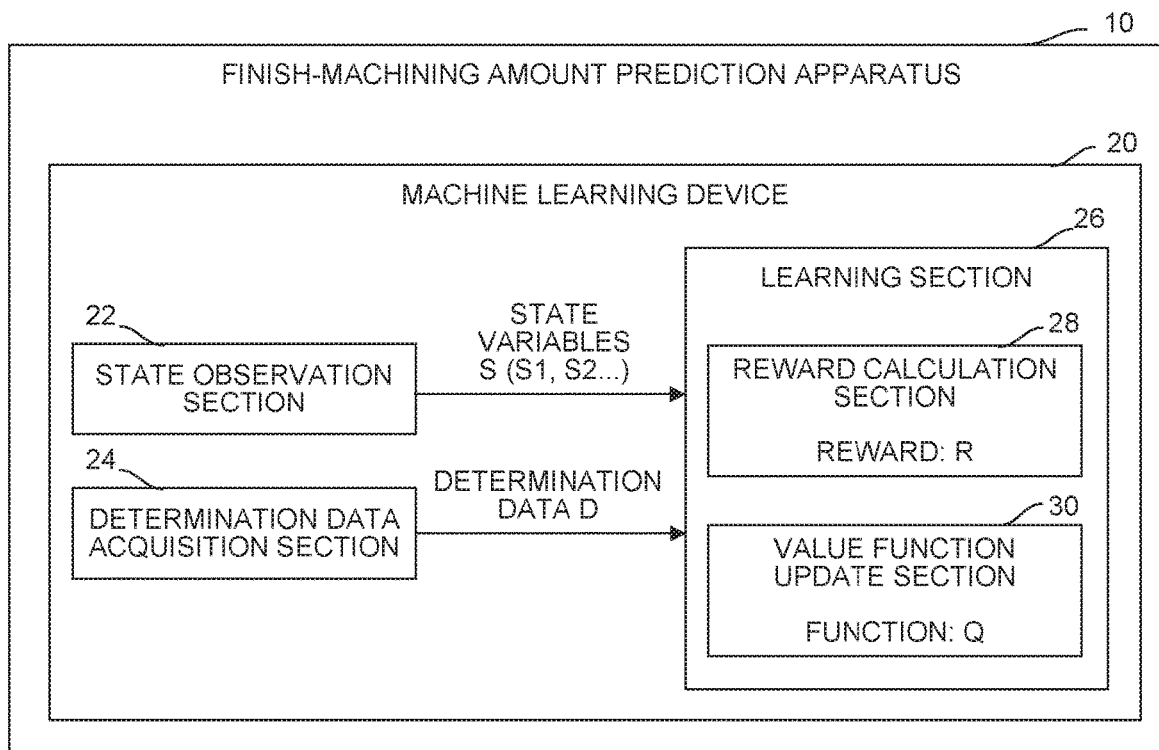

|   | A  | B  | C  | D  | E  | F  | G  | H  |
|---|----|----|----|----|----|----|----|----|
| a | -6 | -4 | -4 | -4 | -4 | -4 | -4 | -5 |
| b | -6 | -5 | -5 | -5 | -6 | -4 | -7 | -4 |
| c | -6 | -5 |    |    |    |    | -5 | -7 |
| d | -5 | -3 |    |    |    |    | -3 | -4 |
| e | -3 | -2 |    |    |    |    | -1 | -3 |
| f | -1 | 0  |    |    |    |    | 2  | 0  |
| g | 1  | 3  |    |    |    |    | 2  | 2  |
| h | 2  | 2  | 1  | 0  | 0  | 1  | 1  | 2  |
| i | 0  | 1  | 0  | 0  | 0  | 1  | 1  | 3  |

MEASUREMENT VALUES

| 4 TIMES |  | 3 TIMES |
| 3 TIMES |  | 3 TIMES |
| 1 TIME  |  | 0 TIMES |

SCRAPING AMOUNTS
(GRINDING FREQUENCIES)

FINISH-MACHINING AMOUNT PREDICTION APPARATUS AND MACHINE LEARNING DEVICE

RELATED APPLICATIONS

The present application claims priority of Japanese Application Number 2017-044274, filed Mar. 8, 2017, the disclosure of which is hereby incorporated by reference herein in its entirety.

BACKGROUND OF THE INVENTION

1. Field of the Invention

The present invention relates to a finish-machining amount prediction apparatus and a machine learning device.

2. Description of the Related Art

In finishing components requiring extremely high accuracy, skilled workers may perform manual machining on the components.

As an example of the manual machining, a wire-electric discharge machine will be exemplified. FIG. 9 is a cross-sectional diagram of a work tank 1 of a wire-electric discharge machine. In installing the wire-electric discharge machine, the upper surface of a table 2 arranged in the work tank 1 and having a workpiece mounted thereon is desirably flat and horizontal to a greater extent. However, when the table 2 is just installed as it is, the upper surface of the table 2 does not sometimes maintain its horizontalness and flatness due to the inclination of the floor of a factory or other factors. In this case, the upper side of the table 2 is removed, and then the attachment surfaces of the upper side of the table 2 are ground so that the upper surface of the table 2 becomes horizontal when the upper side of the table 2 is attached to the lower side of the table 2 again.

On this occasion, a worker measures deviation amounts from a preset reference position of the respective parts of the upper surface of the table 2 with a measurement device such as a distance sensor, determines grinding amounts of the respective parts of the attachment surfaces of the upper side of the table 2 based on his/her experiences after seeing the measurement results, and grinds the respective parts of the attachment surfaces of the upper side of the table 2 based on the determination results. FIG. 10A is a diagram showing deviation amounts from the reference position of the respective parts of the upper surface of the table 2 measured with the measurement device, and FIG. 10B is a diagram showing grinding frequencies of the respective parts of the attachment surfaces of the upper side of the table 2.

In addition, as another example of the manual machining, scraping of the guide of a working machine will be exemplified. Generally, in a working machine, at least one movable table is provided to be movable in orthogonal two-axis directions and orthogonal three-axis directions on a bed. Meanwhile, respective structures configuring the working machine have extremely heavy weights to realize reliable machining. Therefore, when the respective structures are assembled together, a phenomenon in which the structures deform due to their own weights or forces applied between the structures occurs.

For example, when a table 5 provided on a bed 3 moves in an X-axis direction along a rail 4 as shown in FIG. 11, the end of the rail 4 elastically deforms due to the weights of the table 5 and a workpiece (not shown) placed on the table 5, which results in a situation that the table 5 does not move straight.

In view of the problem, a worker measures deviation amounts from a preset reference position of the table 5 in a Z-axis direction with a measurement device such as a distance sensor when the table 5 moves, determines scraping amounts of the respective parts of the upper side of the rail 4 based on his/her experiences after seeing the measurement results, and grinds the respective parts of the upper side of the rail 4 as shown in FIG. 12 (see, for example, Japanese Patent Application Laid-open No. 10-156715). By the scraping, the straight movement of the table 5 is enabled.

When the above finish machining such as grinding and scraping is performed, respective parts are influenced by the configurations of a machine or the finish machining performed on other parts even if the finish machining is performed on the respective parts by their deviation amounts from a reference position measured with a measurement device, which results in a problem that the finish machining with expected accuracy may not be realized.

SUMMARY OF THE INVENTION

Accordingly, it is an object of the present invention to provide a finish-machining amount prediction apparatus and a machine learning device that predict finish-machining amounts based on measurement results in finish machining for improving the accuracy of a working surface.

A finish-machining amount prediction apparatus according to an embodiment of the present invention predicts, when performing finish machining on respective parts of a component to be attached to a machine, finish-machining amounts of the respective parts of the component. The finish-machining amount prediction apparatus includes a machine learning device that learns the finish-machining amounts of the respective parts of the component in the finish machining. The machine learning device has a state observation section that observes, as state variables expressing a current state of an environment, finish-machining amount data indicating the finish-machining amounts of the respective parts of the component in the finish machining and accuracy data indicating accuracy of respective parts of the machine, to which the component measured before a start of the finish machining is attached, a determination data acquisition section that acquires determination data indicating propriety determination results of the accuracy of the respective parts of the machine, to which the component after being subjected to the finish machining is attached, and a learning section that learns the finish-machining amounts of the respective parts of the component in the finish machining in association with the accuracy data by using the state variables and the determination data.

The state observation section may further observe type information for identifying a type of the component as one of the state variables, and the learning section may learn the finish-machining amounts of the respective parts of the component in the finish machining in association with both the accuracy data and the type information.

The learning section may have a reward calculation section that calculates reward relating to the propriety determination results, and a value function update section that updates a function expressing values of the finish-machining amounts of the respective parts of the component in the finish machining by using the rewards.

The learning section may have an error calculation section that calculates an error between a correlation model that derives the finish-machining amounts of the respective parts of the component in the finish machining from the state variables and the determination data and a correlation feature identified from teacher data prepared in advance, and a model update section that updates the correlation model to reduce the error.

The learning section may perform calculation of the state variables and the determination data in a multilayer structure.

The finish-machining amount prediction apparatus may further include a decision-making section that shows or outputs the finish-machining amounts of the respective parts of the component in the finish machining, based on a learning result of the learning section.

The learning section may learn the finish-machining amounts of the respective parts of the component in the finish machining in each of a plurality of industrial machines by using the state variables and the determination data obtained for each of the plurality of industrial machines.

A machine learning device according to an embodiment of the present invention learns, when performing finish machining on respective parts of a component to be attached to a machine, finish-machining amounts of the respective parts of the component. The machine learning device includes: a state observation section that observes, as state variables expressing a current state of an environment, finish-machining amount data indicating the finish-machining amounts of the respective parts of the component in the finish machining and accuracy data indicating accuracy of respective parts of the machine, to which the component measured before a start of the finish machining is attached; a determination data acquisition section that acquires determination data indicating propriety determination results of the accuracy of the respective parts of the machine, to which the component after being subjected to the finish machining is attached; and a learning section that learns the finish-machining amounts of the respective parts of the component in the finish machining in association with the accuracy data by using the state variables and the determination data.

According to an embodiment of the present invention, it becomes possible to automatically predict finish-machining amounts of respective parts based on measurement results in finish machining for improving the accuracy of a working surface.

BRIEF DESCRIPTION OF THE DRAWINGS

FIG. 1 is a schematic function block diagram of a finish-machining amount prediction apparatus according to a first embodiment;

FIG. 2 is a schematic function block diagram showing an embodiment of the finish-machining amount prediction apparatus;

DETAILED DESCRIPTION OF THE PREFERRED EMBODIMENTS

Figure 3:
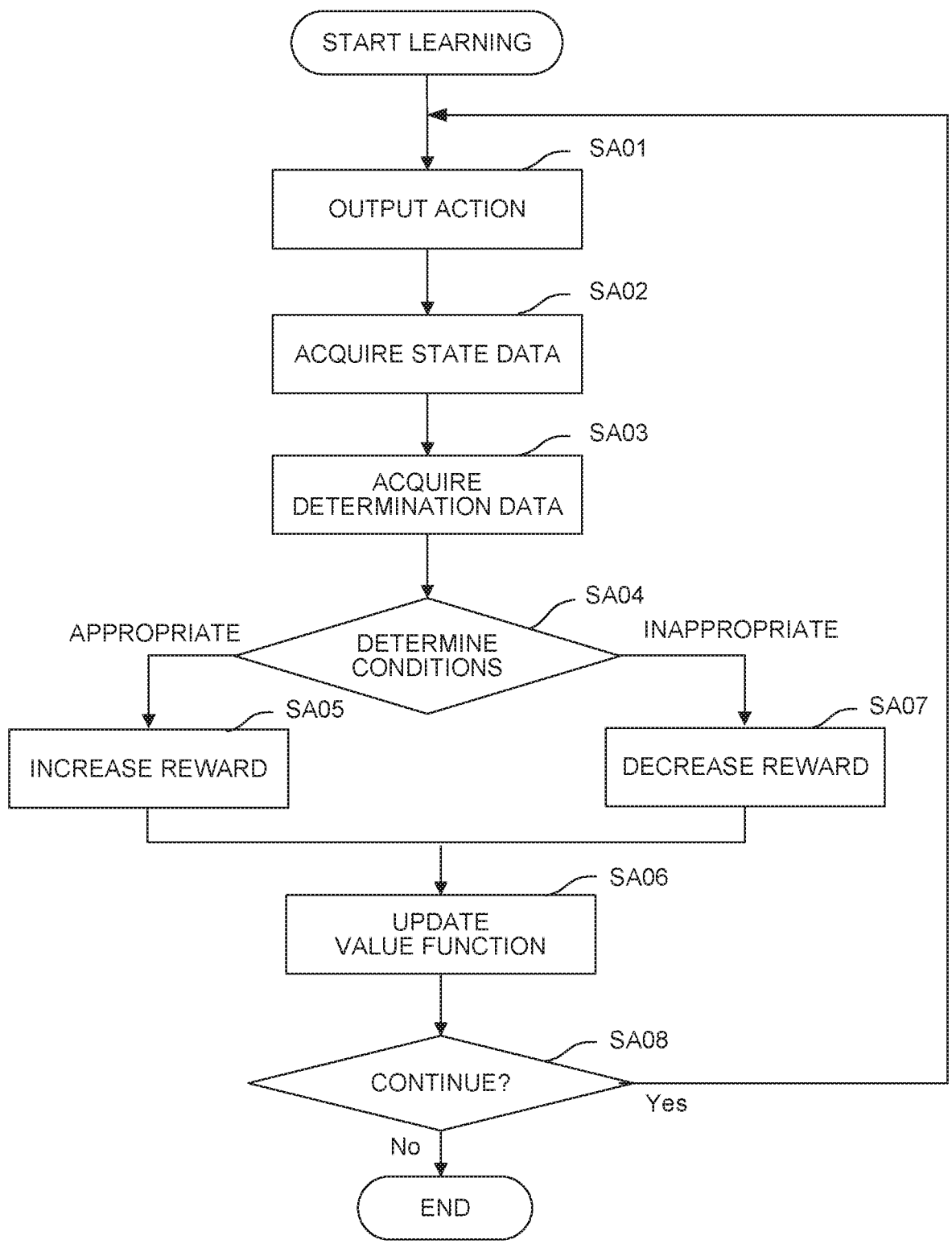
FIG. 3 is a schematic flowchart showing an embodiment of a machine learning method.

FIG. 1 is a schematic function block diagram of a finish-machining amount prediction apparatus 10 according to a first embodiment.

The finish-machining amount prediction apparatus 10 includes a machine learning device 20 having software (such as a learning algorithm) and hardware (such as the CPU of a computer) for spontaneously learning finish-machining amounts (such as grinding frequencies, grinding amounts, and scraping frequencies) of the respective parts of a component by so-called machine learning when finishing the component requiring extremely high accuracy. Finish-machining amounts of the respective parts of a component learned by the machine learning device 20 of the finish-machining amount prediction apparatus 10 correspond to a model structure expressing the correlation between the accuracy (deviations from a reference position) of the respective parts of a machine to which the component is attached in use and the finish-machining amounts of the respective parts of the component.

As shown in the function block of FIG. 1, the machine learning device 20 of the finish-machining amount prediction apparatus 10 includes a state observation section 22, a determination data acquisition section 24, and a learning section 26. The state observation section 22 observes, as state variables S expressing a current state of an environment, finish-machining amount data S1 indicating finish-machining amounts of the respective parts of a component (not shown) to be subjected to finish machining and accuracy data S2 of the respective parts of a machine (not shown) to which the component (not shown) to be subjected to the finish machining is attached. The determination data acquisition section 24 acquires determination data D indicating propriety determination results of the accuracy of the respective parts of a machine in a state in which a component after being subjected to finish machining is attached to the machine. Using the state variables S and the determination data D, the learning section 26 learns finish-machining amounts of the respective parts of a component indicated by the finish-machining amount data S1 in association with the accuracy data S2.

The state observation section 22 may be configured as, for example, one of the functions of the CPU of a computer. Alternatively, the state observation section 22 may be configured as, for example, software for functioning the CPU of a computer. Among the state variables S observed by the state observation section 22, the finish-machining amount data S1 may be acquired from, for example, report data on finish-machining amounts reported by a skilled worker and given to the finish-machining amount prediction apparatus 10. The finish-machining amount data S1 includes, for example, finish-machining amounts such as grinding frequencies, grinding amounts, and scraping frequencies of the respective parts of a component.

In addition, among the state variables S, the accuracy data S2 may be acquired, for example, when a component to be subjected to finish machining is actually measured with a first measurement device (not shown) attached to a machine in a state in which the component is attached to the machine.

For example, when a component to be subjected to finish machining is a table of a wire-electric discharge machine, the first measurement device may measure the positions of a plurality of marks on the upper surface of the table, measure the positions of the four corners of the table, or measure the positions of other plurality of (existing or subsequently provided) noticeable points on the upper surface of the table in a state in which the table is attached. In addition, for example, when a component to be subjected to finish machining is a rail on which a table of a machine tool slides, a first measurement device may move the table to a plurality of coordinate positions and measure the positions of the table at the respective coordinate positions in a state in which the table is placed on the rail. The first measurement device may calculate the differences between the actual measurement positions of measurement spots and the preset reference position of the measurement spots and calculate the accuracy data S2 of the respective parts of a machine to which a component (not shown) to be subjected to finish machining is attached from the calculated differences. The calculation may be performed by, for example, the finish-machining amount prediction apparatus 10 or the state observation section 22 itself. As the first measurement device, a noncontact-type displacement meter using an infrared laser, ultrasonic waves, capacitance, or the like, a contact-type displacement meter having a contact, or the like may be employed.

The determination data acquisition section 24 may be configured as, for example, one of the functions of the CPU of a computer. Alternatively, the determination data acquisition section 24 may be configured as, for example, software for functioning the CPU of a computer. The determination data D acquired by the determination data acquisition section 24 may be acquired, for example, when a component is measured by the first measurement device attached to a machine in a state in which the component after being subjected to finish machining is attached to the machine. The determination data D is an index expressing a result obtained when finish machining is performed under the state variables S and indirectly expresses the current state of an environment in which the finish machining has been performed.

As described above, while the machine learning device 20 of the finish-machining amount prediction apparatus 10 advances machine learning, the measurement by the first measurement device of the accuracy of the respective parts of a machine to which a component to be subjected to finish machining is attached, the implementation of the finish machining for the component, and the remeasurement by the first measurement device of the accuracy of the respective parts of the machine to which the component after being subjected to the finish machining is attached are performed in an environment.

The learning section 26 may be configured as, for example, one of the functions of the CPU of a computer. Alternatively, the learning section 26 may be configured as, for example, software for functioning the CPU of a computer. According to any learning algorithm collectively called machine learning, the learning section 26 learns finish-machining amounts of the respective parts of a component to be subjected to finish machining. The learning section 26 may repeatedly perform learning based on a data set including the above state variables S and the determination data D on a plurality of components to be subjected to finish machining. When a learning cycle is repeatedly performed on a plurality of components, values of finish-machining amounts obtained until the previous learning cycle are used as the finish-machining amount data S1 among the state variables S and propriety determination results of finish machining based on the finish-machining amounts obtained in the learning cycles are used as the determination data D.

By repeatedly performing such a learning cycle, the learning section 26 may automatically identify a feature suggesting the correlation between the accuracy (accuracy data S2) of the respective parts of a machine and finish-machining amounts of the respective parts of a component.

Although the correlation between the accuracy data S2 and finish-machining amounts of the respective parts of a component is substantially unknown at the start of a learning algorithm, the learning section 26 gradually identifies a feature and interprets the correlation as learning is advanced. When the correlation between the accuracy data S2 and finish-machining amounts of the respective parts of a component is interpreted to a certain reliable extent, learning results repeatedly output by the learning section 26 may be used to select the action (that is, decision making) of determining to what extent the respective parts of the component are to be finished for a machine (that is, having deviations from a reference position) in a current state. That is, as a learning algorithm is advanced, the learning section 26 may gradually approximate the correlation between the current state of a component to be subjected to finish machining and the action of determining to what extent the respective parts of the component in the current state are to be finished to an optimum solution.

As described above, in the machine learning device 20 of the finish-machining amount prediction apparatus 10, the learning section 26 learns finish-machining amounts of the respective parts of a component to be subjected to finish machining according to a machine learning algorithm using the state variables S observed by the state observation section 22 and the determination data D acquired by the determination data acquisition section 24. The state variables S are composed of the finish-machining amount data S1 and the accuracy data S2 hardly influenced by disturbance. In addition, the determination data D is uniquely calculated when a component after being subjected to finish machining is attached to a machine. The accuracy data S2 depends on, for example, the measurement accuracy of the respective parts of a machine as the performance of the first measurement device, but it is expected that the accuracy data S2 having high accuracy per se be observed. Similarly, the determination data D also depends on the measurement accuracy of the first measurement device, but it is expected that the determination data D having high accuracy be acquired. Accordingly, using learning results of the learning section 26, the machine learning device 20 of the finish-machining amount prediction apparatus 10 may automatically and accurately calculate finish-machining amounts of the respective parts of a component according to the accuracy of the respective parts of a machine to which the component is attached without relying on calculation or estimation.

Where it is possible to automatically calculate finish-machining amounts of the respective parts of a component without relying on calculation or estimation, the finish-machining amounts of the respective parts of the component may be quickly determined only by the actual measurement of the positions of the respective parts of a machine to which the component before being subjected to finish machining is attached and by the acquisition of deviations from a reference position (accuracy data S2). Accordingly, the speed of the finish machining of a component may be increased.

As a modified example of the machine learning device 20 of the finish-machining amount prediction apparatus 10, the state observation section 22 may further observe type information S3 for identifying a type of a target component as one of the state variables S. The type information S3 may include, for example, information such as a machine type and a component type. The type information S3 may further include a manufacturing lot number of a component and the identification information of a manufacturing company. For example, the type information S3 may be displayed on a component by an identifier such as a barcode. The state observation section 22 may acquire the type information S3 from, for example, the output of a barcode reader. The learning section 26 may learn finish-machining amounts of the respective parts of a component in association with both the accuracy data S2 and the type information S3.

In the above modified example, optimum finish-machining amounts of the respective parts of a component according to deviations from a reference position of the respective parts of a machine to which the component is attached and a type may be learned. For example, when deviations from a reference position (accuracy data S2) of the respective parts of a machine are the same between two components but materials or the like (type information S3) of the components are different, there is a likelihood that finish-machining amounts of the respective parts of the components are slightly different. According to the above configuration, finish-machining amounts of the respective parts of components may be optimized according to materials or the like (type information S3) of the components even under such a condition. Alternatively, there is also a case that the correlation between deviations from a reference position (accuracy data S2) of the respective parts of a machine and materials or the like (type information S3) of components may be found as learning is advanced. In this case, the prediction of the accuracy data S2 from the type information S3 is made possible to a certain extent. Therefore, even in a case in which the measurement accuracy of the respective parts of a machine with the first measurement device is low, it is possible to appropriately settle learning and optimize finish-machining amounts of the respective parts of components.

As another modified example of the machine learning device 20 of the finish-machining amount prediction apparatus 10, the learning section 26 may learn finish-machining amounts of the respective parts of a component in each of a plurality of machines using the state variables S and the determination data D acquired for each of the plurality of machines having the same machine configuration. According to the configuration, it is possible to increase an amount of a data set including the state variables S and the determination data D acquired in a certain period of time. Therefore, the learning speed and the reliability of the finish-machining amounts of the respective parts of a component may be improved with a set of more various data as inputs.

In the machine learning device 20 having the above configuration, a learning algorithm performed by the learning section 26 is not particularly limited. For example, a learning algorithm known as machine learning such as supervised learning, unsupervised learning, reinforcement learning, and a neural network may be employed.

FIG. 2 shows, as an embodiment of the finish-machining amount prediction apparatus 10 shown in FIG. 1, a configuration including the learning section 26 that performs reinforcement learning as an example of a learning algorithm. The reinforcement learning is a method in which, while the current state (that is, an input) of an environment in which a learning target exists is observed, a prescribed action (that is, an output) is performed in the current state and the cycle of giving any reward to the action is repeatedly performed by trial and error to learn measures (finish-machining amounts of the respective parts of a component in the machine learning device of the present application) to maximize the total of the rewards as an optimum solution.

In the machine learning device 20 of the finish-machining amount prediction apparatus 10 shown in FIG. 2, the learning section 26 includes a reward calculation section 28 that calculates rewards R relating to propriety determination results (corresponding to the determination data D used in the next learning cycle) of the accuracy of the respective parts of a machine to which a component after being subjected to finish machining is attached based on the state variables S is attached, and includes a value function update section 30 that updates, using the rewards R, a function Q employed when finish machining is performed and expressing values of the finish-machining amounts of the respective parts of a component. The learning section 26 learns finish-machining amounts of the respective parts of a component in such a way that the value function update section 30 repeatedly updates the function Q.

An example of the reinforcement learning algorithm performed by the learning section 26 will be described. The algorithm in this example is known as Q-learning and represents a method in which a state s of a subject of action and an action a possibly taken by the subject of action in the state s are assumed as independent variables and a function Q(s, a) expressing an action value when the action a is selected in the state s is learned. The selection of the action a by which the value function Q becomes the largest in the state s results in an optimum solution. By starting the Q-learning in a state in which the correlation between the state s and the action a is unknown and repeatedly performing the selection of various actions a by trial and error in any state s, the value function Q is repeatedly updated to be approximated to an optimum solution. Here, when an environment (that is, the state s) changes as the action a is selected in the state s, a reward (that is, weighting of the action a) r is obtained according to the change and the learning is directed to select an action a by which a higher reward r is obtained. Thus, the value function Q may be approximated to an optimum solution in a relatively short period of time.

Generally, the update formula of the value function Q may be expressed like the following Formula (1). In Formula (1), $s_t$ and $a_t$ express a state and an action at a time t, respectively, and the state changes to $s_{t+1}$ with the action $a_t$. $r_{t+1}$ expresses a reward obtained when the state changes from $s_t$ to $s_{t+1}$. Q in the term of maxQ represents a case in which an action a by which the maximum value Q is obtained at a time t+1 (which is assumed at a time t) is performed. α and γ express a learning coefficient and a discount rate, respectively, and arbitrarily set to fall within $0<\alpha\le1$ and $0<\gamma\le1$, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

When the learning section 16 performs the Q-learning, the state variables S observed by the state observation section 22 and the determination data D acquired by the determination data acquisition section 24 correspond to the state s in the update formula, the action of changing finish-machining amounts of the respective parts of a component for a machine (having deviations from a reference position) in a current state corresponds to the action a in the update formula, and the rewards R calculated by the reward calculation section 28 correspond to the reward r in the update formula. Accordingly, the value function update section 30 repeatedly updates the function Q expressing values of the finish-machining amounts of the respective parts of a component in a current state by the Q-learning using the rewards R.

The rewards R calculated by the reward calculation section 28 may be positive, for example, if the accuracy of the respective parts of a machine to which a component after being subjected to finish machining is attached is determined to be "appropriate" (that is, if deviations from a reference position of the respective parts of the machine to which the component after being subjected to the finish machining is attached fall within an allowable range) when the finish machining is performed based on finish-machining amounts of the respective parts of the component after the determination of the finish-machining amounts. On the other hand, the rewards R calculated by the reward calculation section 28 may be negative, for example, if the accuracy of the respective parts of a machine to which a component after being subjected to finish machining is attached is determined to be "inappropriate" (that is, if deviations from a reference position of the respective parts of the machine to which the component after being subjected to the finish machining is attached exceed an allowable range) when the finish machining is performed based on finish-machining amounts of the respective parts of the component after the determination of the finish-machining amounts. The absolute values of the positive and negative rewards R may be the same or different from each other.

At this time, the reward calculation section 28 determines if deviations from a reference position of the respective parts of a machine to which a component after being subjected to finish machining is attached fall within an allowable range. If deviations from the reference position of all the parts fall within the allowable range, the accuracy of the machine may be determined to be "appropriate." On the other hand, if the total of the deviations from the reference position of the respective parts of the machine falls within the allowable range, the accuracy of the machine may be determined to be "appropriate." Alternatively, the accuracy of the machine may be determined by the combination of these methods.

In addition, propriety determination results of the accuracy of the respective parts of a machine to which a component is attached are not limited to "appropriate" and "inappropriate" results but may be set at a plurality of stages according to the extents of the deviations of positions. As an example, when a maximum value of an allowable range is assumed as Tmax, the reward R=5 is given if deviations U from a reference position of the respective parts of a machine to which a component after being subjected to finish machining is attached fall within $0 \leq U < Tmax/5$, the reward R=2 is given if the deviations U from the reference position of the respective parts of the machine to which the component after being subjected to the finish machining is attached fall within $Tmax/5 \leq U < Tmax/2$, and the reward R=1 is given if the deviations U from the reference position of the respective parts of the machine to which the component after being subjected to the finish machining is attached fall within $Tmax/2 \leq U < Tmax$. In addition, Tmax may be set to be relatively larger at the initial stage of the learning and set to decrease as the learning is advanced.

The value function update section 30 may have an action value table in which the state variables S, the determination data D, and the rewards R are organized in association with action values (for example, numeric values) expressed by the function Q. In this case, the action of updating the function Q with the value function update section 30 is equivalent to the action of updating the action value table with the value function update section 30. At the start of the Q-learning, the correlation between the current state of an environment and finish-machining amounts of the respective parts of a component is unknown. Therefore, in the action value table, various kinds of the state variables S, the determination data D, and the rewards R are prepared in association with values (function Q) of randomly-set action values. Note that the reward calculation section 28 may immediately calculate the rewards R corresponding to the determination data D when the determination data D is known, and values of the calculated rewards R are written in the action value table.

When the Q-learning is advanced using the rewards R corresponding to propriety determination results of the accuracy of the respective parts of a machine to which a component is attached, the learning is directed to select the action of obtaining higher rewards R and values (function Q) of action values for an action performed in a current state are rewritten to update the action value table according to the state of an environment (that is, the state variables S and the determination data D) that changes as the selected action is performed in the current state. By repeatedly performing the update, values (the function Q) of action values displayed in the action value table are rewritten to be larger as an action is more appropriate. In the way described above, the correlation between a current state (the accuracy of the respective parts of a machine to which a component is attached) in an unknown environment and a corresponding action (determination of finish-machining amounts of the respective parts of the component) becomes gradually obvious. That is, by the update of the action value table, the relationship between the states of the deviations of the respective parts of a machine to which a component before being subjected to finish machining is attached and finish-machining amounts of the respective parts of the component is gradually approximated to an optimum solution.

The flow of the above Q-learning (that is, an embodiment of a machine learning method) performed by the learning section 26 will be further described with reference to FIG. 3.

First, in step SA01, the value function update section 30 randomly selects, by referring to an action value table at that time, finish-machining amounts of the respective parts of a component as an action performed in a current state indicated by the state variables S observed by the state observation section 22. Next, the value function update section 30 imports the state variable S in the current state observed by the state observation section 22 in step SA02, and imports the determination data D in the current state acquired by the determination data acquisition section 24 in step SA03.

Then, the value function update section 30 determines if the finish-machining amounts of the respective parts of the component in finish machining are appropriate based on the determination data D. If the finish-machining amounts are appropriate, in step SA05 the value function update section 30 applies a positive reward R calculated by the reward calculation section 28 to the update formula of the function Q. Next, in step SA06, the value function update section 30 updates the action value table using the state variable S and the determination data D in the current state, the reward R, and a value (updated function Q) of an action value. If it is determined in step SA04 that the finish-machining amounts of the respective parts of the component in the finish machining are inappropriate, the value function update section 30 applies a negative reward R calculated by the reward calculation section 28 to the update formula of the function Q in step SA07. Then, in step SA06, the value function update section 30 updates the action value table using the state variable S and the determination data D in the current state, the reward R, and the value (updated function Q) of the action value.

The flow of the Q-learning returns back to step SA01 if the finish-machining amount of all of the respective parts of the component has not been determined yet at SA08, and the learning section 26 updates the action value table over again by repeatedly performing processing in the steps SA01 to SA07 and advances the learning of the finish-machining amounts of the respective parts of the component.

Figure 4:
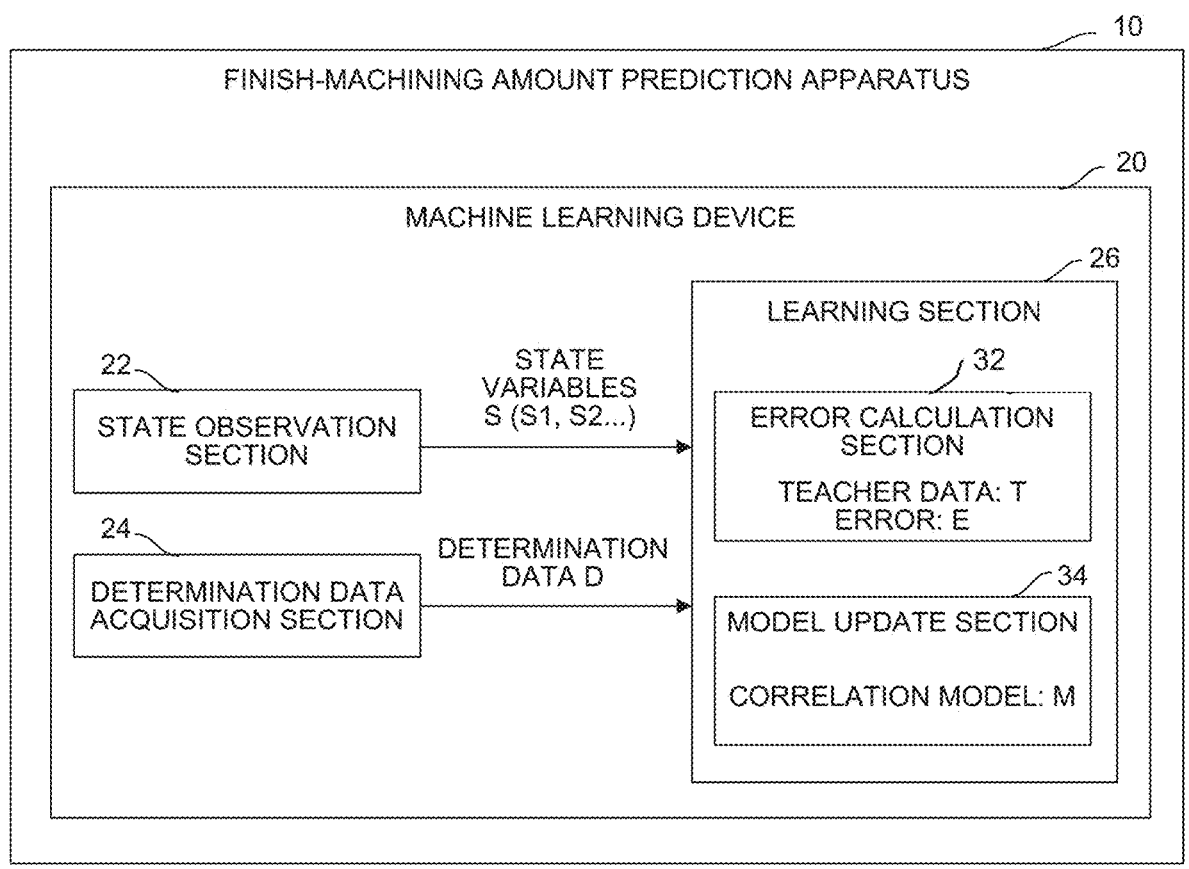
FIG. 4 is a schematic function block diagram showing another embodiment of the finish-machining amount prediction apparatus.

FIG. 4 shows, as another embodiment of the finish-machining amount prediction apparatus 10 shown in FIG. 1, a configuration including the learning section 26 that performs supervised learning as another example of a learning algorithm.

The supervised learning is a method in which large amounts of known data sets (called teacher data) of inputs and corresponding outputs are given in advance unlike the above reinforcement learning that starts learning in a state in which the relationship between inputs and outputs is unknown, and a feature suggesting the correlation between the inputs and the outputs are identified from the teacher data to learn a correlation model (finish-machining amounts of the respective parts of a component in the machine learning device 20 of the present application) for estimating desired outputs with respect to new inputs.

In the machine learning device 20 of the finish-machining amount prediction apparatus 10 shown in FIG. 4, the learning section 26 includes an error calculation section 32 that calculates an error E between a correlation model M that derives finish-machining amounts of the respective parts of a component from the state variables S and the determination data D and a correlation feature identified from teacher data T prepared in advance, and includes a model update section 34 that updates the correlation model M to reduce the error E. The learning section 26 learns finish-machining amounts of the respective parts of a component in such a way that the model update section 34 repeatedly updates the correlation model M.

The initial value of the correlation model M is expressed by simplifying (for example, by using a linear function), for example, the correlation between the state variables S and the determination data D and finish-machining amounts of the respective parts of a component, and given to the learning section 26 before the start of the supervised learning. The teacher data T may be configured by, for example, experimental values (known data sets of the accuracy of the respective parts of a machine to which the component is attached and the corresponding finish-machining amounts of the respective parts of the component) accumulated when a skilled worker records determined finish-machining amounts of the respective parts of a component in the past finish machining for the component, and given to the learning section 26 before the start of the supervised learning.

The error calculation section 32 identifies a correlation feature suggesting the correlation between the accuracy of the respective parts of a machine to which a component is attached and finish-machining amounts of the respective parts of the component from the large amounts of the teacher data T given to the learning section 26, and calculates the error E between the correlation feature and the correlation model M corresponding to the state variables S and the determination data D in a current state. The model update section 34 updates the correlation model M to reduce the error E according to, for example, an update rule set in advance.

In the next learning cycle, the error calculation section 32 calculates the error E about the correlation model M corresponding to the changed state variables S and the determination data D using the state variables S and the determination data D changed when a mounting step is performed by trial and error according to the updated correlation model M, and the model update section 34 updates the correlation model M again. In the way described above, the correlation between a current state (the accuracy of the respective parts of a machine to which a component is attached) in an unknown environment and a corresponding action (finish-machining amounts of the respective parts of the component) becomes gradually obvious. That is, by the update of the correlation model M, the relationship between the states of deviations from a reference position of the respective parts of a machine to which a component before being subjected to finish machining is attached and finish-machining amounts of the respective parts of the component in the finish machining subjected to the component to solve the deviations from the reference position is gradually approximated to an optimum solution.

Note that in the machine learning device 20 of the finish-machining amount prediction apparatus 10, the learning section 26 may perform the supervised learning at the initial stage of learning and then perform the reinforcement learning with finish-machining amounts of the respective parts of a component learned by the supervised learning as initial values when the learning is advanced to a certain extent. Since the initial values in the reinforcement learning have reliability to a certain extent, an optimum solution may be relatively quickly obtained even in a case in which high-accuracy finish machining is required as described above.

Figure 5A:
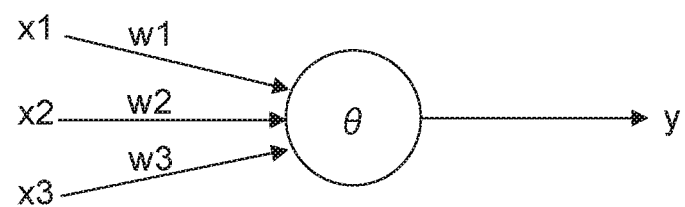
FIG. 5A is a diagram for describing a neuron.
Figure 5B:
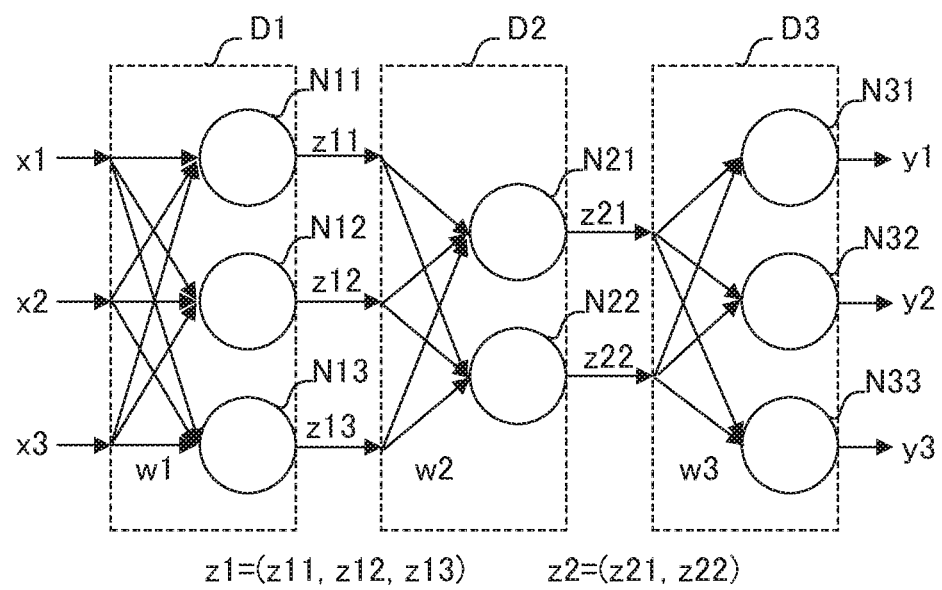
FIG. 5B is a diagram for describing a neural network.

In advancing the above reinforcement learning and the supervised learning, a neural network may be used instead of, for example, the Q-learning. FIG. 5A schematically shows a neuron model. FIG. 5B schematically shows the model of a neural network having three layers D1, D2 and D3 in which the neurons shown in FIG. 5A are combined together. The neural network may be configured by, for example, a calculation unit, a storage unit, or the like following a neuron model.

The neuron shown in FIG. 5A outputs an output y with respect to a plurality of inputs x (here, inputs $x_1$ to $x_3$ as an example). On each of the inputs $x_1$ to $x_3$, weights w ($w_1$ to $w_3$) corresponding to respective inputs x are placed. Thus, the neuron outputs the output y expressed by the following Formula (2). Note that in the following Formula (2), an input x, an output y, and a weight w are all vectors. In addition, θ indicates a bias, and $f_k$ indicates an activation function.

$$y = f_k(\Sigma_{i=1}^{n} x_i w_i - \theta) \quad (2)$$

In the neural network having the three layers shown in FIG. 5B, a plurality of inputs x (here, inputs x1 to x3 as an example) is input from the left side of the neural network, and results y (here, results y1 to y3 as an example) are output from the right side of the neural network. In the example shown in FIG. 5B, corresponding weights (collectively expressed as w1) are multiplied by the inputs x1 to x3, and the inputs x1 to x3 are input to three neurons N11 to N13, respectively.

In FIG. 5B, the respective outputs of the neurons N11 to N13 are collectively expressed as z1. The outputs z1 may be regarded as feature vectors obtained by extracting feature amounts of the input vectors. In the example shown in FIG. 5B, corresponding weights (collectively indicated as w2) are multiplied by the respective feature vectors z1, and the feature vectors z1 are input to two neurons N21 and N22, respectively. The feature vectors z1 express the features between the weights w1 and the weights w2.

In FIG. 5B, the respective outputs of neurons N21 and N22 are collectively indicated as z2. The outputs z2 may be regarded as feature vectors obtained by extracting feature amounts of the feature vectors z1. In the example shown in FIG. 5B, corresponding weights (collectively indicated as w3) are multiplied by the respective feature vectors z2, and the feature vectors z2 are input to three neurons N31 to N33, respectively. The feature vectors z2 express the features between the weights w2 and the weight w3. Finally, the neurons N31 to N33 output the results y1 to y3, respectively.

In the machine learning device 20 of the finish-machining amount prediction apparatus 10, the learning section 26 performs the calculation of the state variables S and the determination data D as inputs in a multilayer structure according to the above neural network x to be capable of outputting finish-machining amounts (result y) of the respective parts of a component.

Note that the action mode of the neural network includes a learning mode and a value prediction mode. For example, it is possible to learn a weight w using a learning data set in the learning mode and determine an action value using the learned weight w in the value prediction mode. Note that detection, classification, deduction, or the like may be performed in the value prediction mode.

The configuration of the above finish-machining amount prediction apparatus 10 may be described as a machine learning method (or software) performed by the CPU of a computer. According to the machine learning method, finish-machining amounts of the respective parts of a component are learned to perform finish machining on the component. The machine learning method includes: a step of observing, with the CPU of a computer, finish-machining amount data S1 indicating finish-machining amounts of the respective parts of a component in finish machining for the component and accuracy data S2 indicating the accuracy of the respective parts of a machine to which the component to be subjected to the finish machining is attached, as state variables S expressing the current state of an environment in which the finish machining is performed on the component; a step of acquiring determination data D indicating propriety determination results of the accuracy of the respective parts of the machine to which the component after being subjected to the finish machining is attached; and a step of learning the finish-machining amounts of the respective parts of the component in association with the accuracy data S2, using the state variables S and the determination data D.

Figure 6:
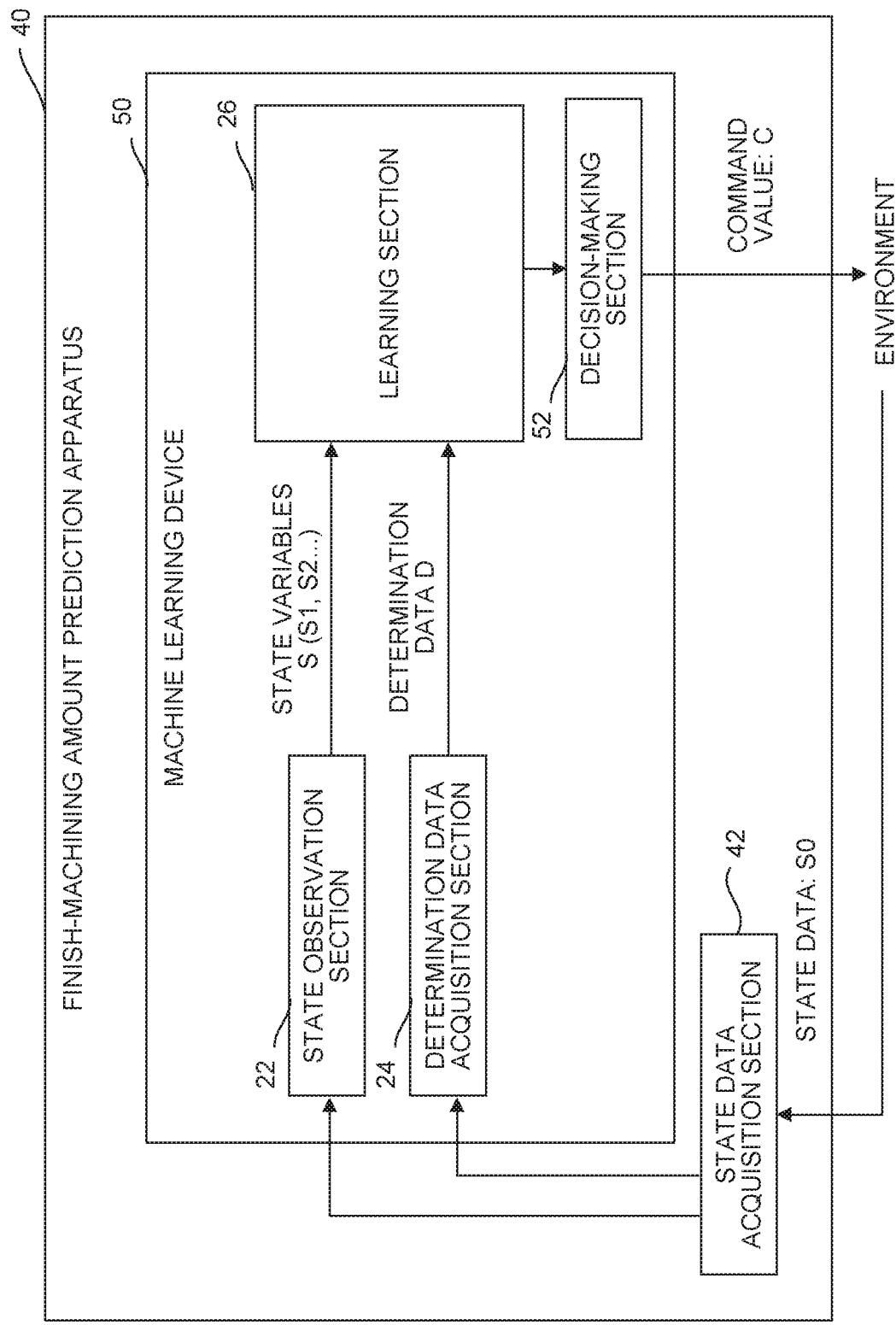
FIG. 6 is a schematic function block diagram of a finish-machining amount prediction apparatus according to a second embodiment.

FIG. 6 shows a finish-machining amount prediction apparatus 40 according to a second embodiment.

The finish-machining amount prediction apparatus 40 includes a machine learning device 50 and a state data acquisition section 42 that acquires finish-machining amount data S1 and accuracy data S2 of state variables S observed by a state observation section 22 as state data S0. The state data S0 acquired by the state data acquisition section 42 may also include type information S3. The state data acquisition section 42 may acquire the state data S0 from the above first measurement device attached to a machine or appropriate data inputs by a worker.

The machine learning device 50 of the finish-machining amount prediction apparatus 40 includes, besides software (such as a learning algorithm) and hardware (such as the CPU of a computer) for spontaneously learning finish-machining amounts of the respective parts of a component in finish machining for the component by machine learning, software (such as a calculation algorithm) and hardware (such as the CPU of a computer) for indicating the learned finish-machining amounts of the respective parts of the component or outputting the same to an industrial machine that performs the finish machining as a command. The machine learning device 50 of the finish-machining amount prediction apparatus 40 may be so configured that one common CPU performs all software such as a learning algorithm and a calculation algorithm.

Figures 9, 10A, 10B:
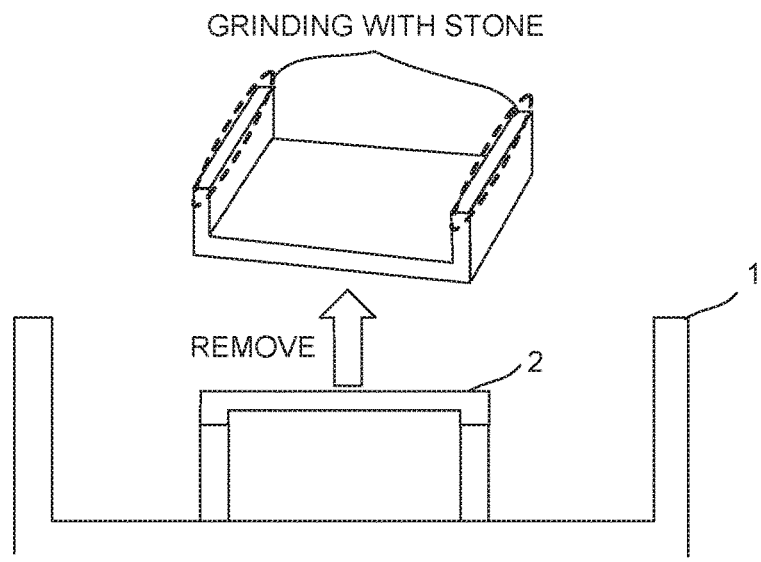
FIG. 9 is a cross-sectional diagram of the work tank of a wire-electric discharge machine.
FIG. 10A is a diagram showing deviation amounts from a reference position of the respective parts of the upper surface of a table measured with a measurement device.
FIG. 10B is a diagram showing grinding frequencies of the respective parts of the attachment surfaces of the upper side of the table.
Figure 11:
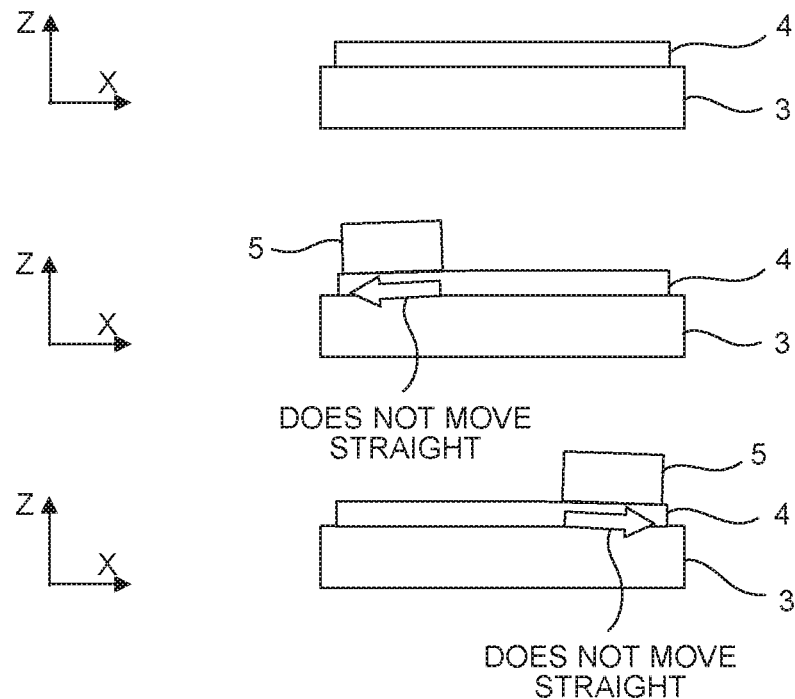
FIG. 11 is a diagram showing deviations occurring when the table of a machine tool moves.
Figure 12:
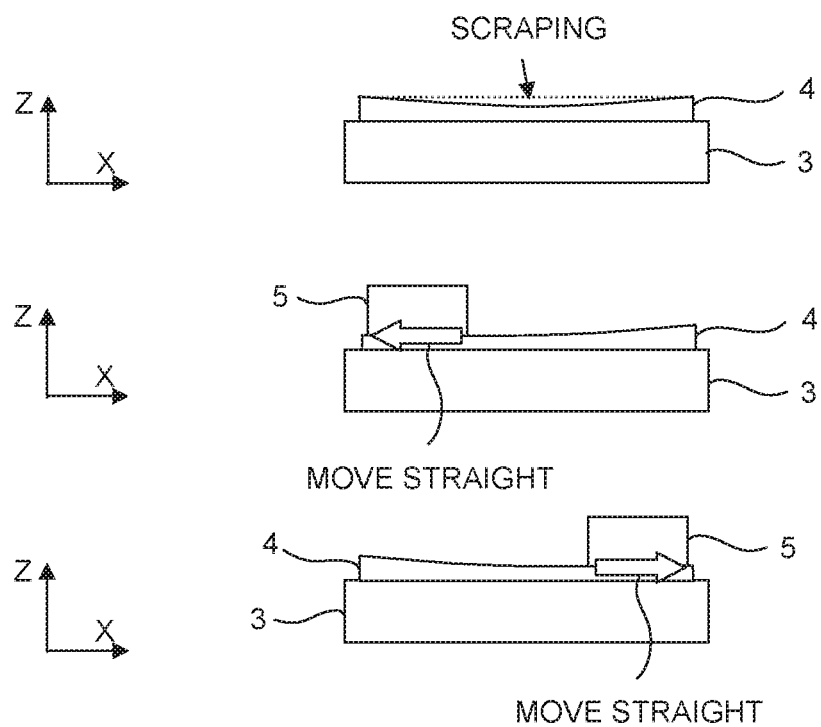
FIG. 12 is a diagram showing the movement of the table of the machine tool of which the deviations have been corrected by scraping.

A decision-making section 52 may be configured as, for example, one of the functions of the CPU of a computer. Alternatively, the decision-making section 52 may be configured as, for example, software for functioning the CPU of a computer. The decision-making section 52 indicates finish-machining amounts of the respective parts of a component learned by the learning section 26 to a worker as, for example, scraping amounts shown in FIG. 10B or the like, or generates and outputs a command value C for an industrial machine that performs finish machining based on finish-machining amounts of the respective parts of a component learned by the learning section 26. When the decision-making section 52 indicates finish-machining amounts of the respective parts of a component and then a worker performs finish machining based on the finish-machining amount or when the decision-making section 52 outputs the command value C to an industrial machine, the state (finish-machining amount data S1) of an environment changes correspondingly.

The state observation section 22 observes, in a next learning cycle, state variables S including finish-machining amount data S1 changed after the indication or the output of finish-machining amounts of the respective parts of a component to an environment by the decision-making section 52. The learning section 26 updates, for example, a value function Q (that is, an action value table) using the changed state variables S to learn finish-machining amounts of the respective parts of a component.

Based on learned finish-machining amounts of the respective parts of a component, the decision-making section 52 performs the indication of the finish-machining amounts of the respective parts of the component or the output of a command value C to an industrial machine according to state variables S. By repeatedly performing the cycle, the machine learning device 50 advances the learning of finish-machining amounts of the respective parts of a component and gradually improves the reliability of the finish-machining amounts of the respective parts of the component.

The machine learning device 50 of the finish-machining amount prediction apparatus 40 having the above configuration produces the same effect as that of the above machine learning device 20. Particularly, the machine learning device 50 may change the state of an environment with the output of the decision-making section 52. On the other hand, the machine learning device 20 may ask a function corresponding to a decision-making section for reflecting a learning result of the learning section 26 on an environment for an external device (for example, the controller of an industrial machine).

Figure 7:
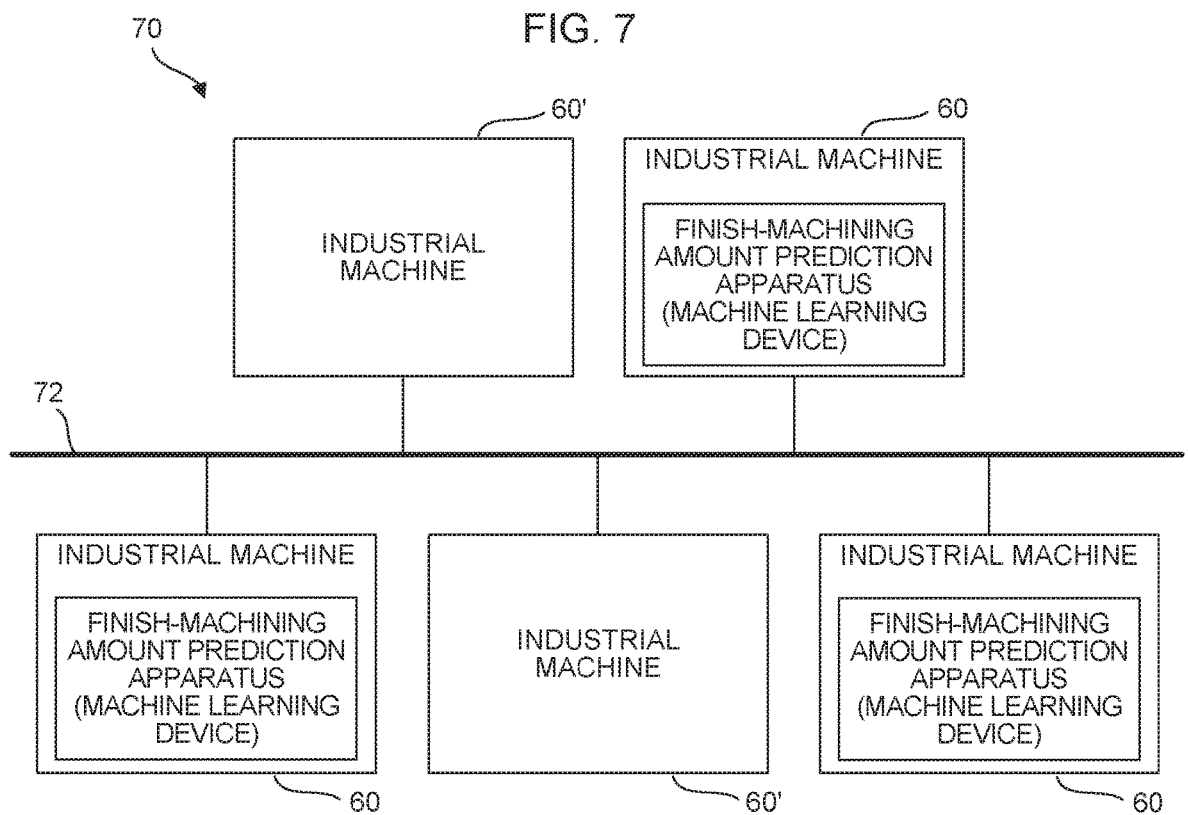
FIG. 7 is a schematic function block diagram showing an embodiment of an assembling system.

FIG. 7 shows an assembling system 70 including industrial machines 60 according to an embodiment. The assembling system 70 includes a plurality of industrial machines 60 and 60' having the same machine configuration and a network 72 that connects the industrial machines 60 and 60' to each other, and at least one of the plurality of industrial machines 60 and 60' is configured as an industrial machine 60 including the above finish-machining amount prediction apparatus 40. In addition, the assembling system 70 may have an industrial machine 60' that does not include the finish-machining amount prediction apparatus 40. The industrial machines 60 and 60' have the configurations of general industrial machines required in finish machining for components provided in the machines.

In the assembling system 70 having the above configuration, the industrial machine 60 including the finish-machining amount prediction apparatus 40 among the plurality of industrial machines 60 and 60' may automatically and accurately calculate finish-machining amounts of the respective parts of a component according to the accuracy of the respective parts of a machine to which the component to be subjected to finish machining is attached without relying on calculation or estimation using a learning result of the learning section 26. In addition, the finish-machining amount prediction apparatus 40 of at least one industrial machine 60 may learn finish-machining amounts of the respective parts of a component common to all the industrial machines 60 and 60' based on state variables S and determination data D obtained for each of the other plurality of industrial machines 60 and 60' so that the learning result is shared between all the industrial machines 60 and 60'. Accordingly, the assembling system 70 makes it possible to improve the speed and the reliability of learning finish-machining amounts of the respective parts of a component with a broader range of data sets (including state variables S and determination data D) as inputs.

Figure 8:
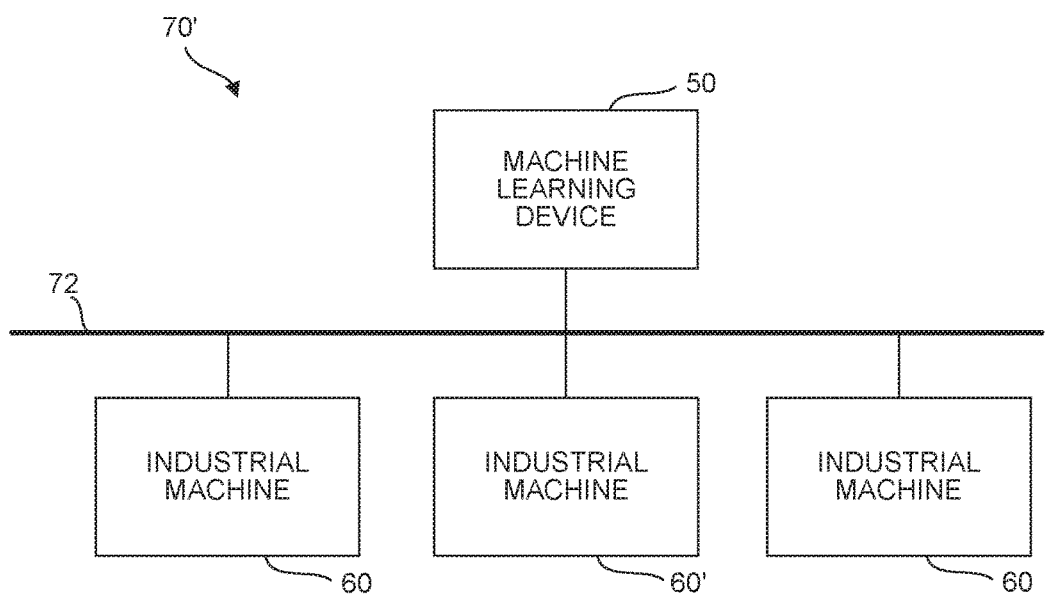
FIG. 8 is a schematic function block diagram showing another embodiment of an assembling system.

FIG. 8 shows an assembling system 70' including industrial machines 60' according to another embodiment. The assembling system 70' includes the machine learning device 50 (or 20), a plurality of industrial machines 60' having the same machine configuration, and a network 72 that connects the industrial machines 60' and the machine learning device 50 (or 20) to each other.

In the assembling system 70' having the above configuration, the machine learning device 50 (or 20) may learn finish-machining amounts of the respective parts of a component common to all the industrial machines 60' based on state variables S and determination data D obtained for each of the plurality of industrial machines 60', and automatically and accurately calculate finish-machining amounts of the respective parts of a component according to the accuracy of the respective parts of a machine to which the component to be subjected to finish machining is attached without relying on calculation or estimation using the learning result.

In the assembling system 70', the machine learning device 50 (or 20) may have a configuration existing in a cloud server provided in the network 72. According to the configuration, a desired number of the industrial machines 60' may be connected to the machine learning device 50 (or 20) where necessary regardless of the existing locations and the times of the plurality of industrial machines 60'.

A worker engaging in the assembling systems 70 and 70' may perform a determination as to whether the achievement degree of the finish-machining amounts of the respective parts of a component (that is, the reliability of the finish-machining amounts of the respective parts of the component) with the machine learning device 50 (or 20) has reached a required level at an appropriate timing after the start of learning by the machine learning device 50 (or 20).

The embodiments of the present invention are described above. However, the present invention is not limited to the examples of the above embodiments and may be carried out in various modes with the addition of appropriate modifications.

For example, a learning algorithm performed by the machine learning devices 20 and 50, a calculation algorithm performed by the machine learning device 50, and a control algorithm performed by the finish-machining amount prediction apparatuses 10 and 40 are not limited to the above ones, but various algorithms may be employed.

The invention claimed is:

1. A finish-machining amount prediction apparatus for predicting, when performing finish machining on respective parts of a component to be attached to a machine, finish-machining amounts of the respective parts of the component, the finish-machining amount prediction apparatus comprising:
   a machine learning device for learning the finish-machining amounts of the respective parts of the component in the finish machining, wherein
   the machine learning device has a processor configured to:
      observe, as state variables expressing a current state of an environment, (a) finish-machining amount data indicating the finish-machining amounts of the respective parts of the component in the finish machining and (b) accuracy data indicating accuracy of respective parts of the machine, to which the component measured before a start of the finish machining is attached, wherein
         the finish machining includes grinding and scraping,
         the finish-machining amount data include at least one of grinding frequencies, grinding amounts, and scraping frequencies of the respective parts of the component,
      acquire determination data indicating propriety determination results of the accuracy of the respective parts of the machine, to which the component after being subjected to the finish machining is attached,
      learn the finish-machining amounts of the respective parts of the component in the finish machining in association with the accuracy data by using the state variables and the determination data,
      calculate an error between (i) a correlation model that derives the finish-machining amounts of the respective parts of the component in the finish machining from the state variables and the determination data and (ii) a correlation feature identified from teacher data prepared in advance, and
      update the correlation model to reduce the error, and
   the teacher data is configured by experimental values accumulated when a worker records determined finish-machining amounts of the respective parts of the component in past finish machining for the component.

2. The finish-machining amount prediction apparatus according to claim 1, wherein
   the processor is further configured to:
      observe type information for identifying a type of the component as one of the state variables, the type information including:

machine type information identifying a type of the machine, and component type information identifying a type of the component, a manufacturing lot number of the component, and identification information of a manufacturing company that manufactured the component, and learn the finish-machining amounts of the respective parts of the component in the finish machining in association with both the accuracy data and the type information.

3. The finish-machining amount prediction apparatus according to claim 1, wherein
the processor is further configured to:
calculate rewards relating to the propriety determination results, and
update a function expressing values of the finish-machining amounts of the respective parts of the component in the finish machining by using the rewards.

4. The finish-machining amount prediction apparatus according to claim 1, wherein
the processor is further configured to perform calculations of the state variables and the determination data in a multilayer structure.

5. The finish-machining amount prediction apparatus according to claim 1, wherein
the processor is further configured to show or output the finish-machining amounts of the respective parts of the component in the finish machining, based on the learned finish-machining amounts.

6. The finish-machining amount prediction apparatus according to claim 1, wherein
the processor is further configured to learn the finish-machining amounts of the respective parts of the component in the finish machining in each of a plurality of industrial machines by using the state variables and the determination data obtained for each of the plurality of industrial machines.

7. The finish-machining amount prediction apparatus according to claim 1, wherein
the finish-machining amount data include all of the grinding frequencies, the grinding amounts, and the scraping frequencies of the respective parts of the component.

8. The finish-machining amount prediction apparatus according to claim 1, wherein
the propriety determination results of the accuracy include a plurality of stages according to extents of deviations of positions relative to a maximum value of an allowable range.

9. The finish-machining amount prediction apparatus according to claim 8, wherein
the maximum value of the allowable range is set larger at an initial stage of the learning, and set to decrease as the learning is advanced.

10. A machine learning device for learning, when performing finish machining on respective parts of a component to be attached to a machine, finish-machining amounts of the respective parts of the component, the machine learning device comprising;
a processor configured to:
observe, as state variables expressing a current state of an environment, (a) finish-machining amount data indicating the finish-machining amounts of the respective parts of the component in the finish machining and (b) accuracy data indicating accuracy of respective parts of the machine, to which the component measured before a start of the finish machining is attached, wherein
the finish machining includes grinding and scraping,
the finish-machining amount data include at least one of grinding frequencies, grinding amounts, and scraping frequencies of the respective parts of the component,
acquire determination data indicating propriety determination results of the accuracy of the respective parts of the machine, to which the component after being subjected to the finish machining is attached,
learn the finish-machining amounts of the respective parts of the component in the finish machining in association with the accuracy data by using the state variables and the determination data,
calculate an error between (i) a correlation model that derives the finish-machining amounts of the respective parts of the component in the finish machining from the state variables and the determination data and (ii) a correlation feature identified from teacher data prepared in advance, and
update the correlation model to reduce the error, and
the teacher data is configured by experimental values accumulated when a worker records determined finish-machining amounts of the respective parts of the component in past finish machining for the component.

11. The machine learning device according to claim 10, wherein
the finish-machining amount data include all of the grinding frequencies, the grinding amounts, and the scraping frequencies of the respective parts of the component.

12. The machine learning device according to claim 10, wherein
the propriety determination results of the accuracy include a plurality of stages according to extents of deviations of positions relative to a maximum value of an allowable range.

13. The machine learning device according to claim 12, wherein
the maximum value of the allowable range is set larger at an initial stage of the learning, and set to decrease as the learning is advanced.

* * * * *